United States Patent [19]

Farnand

[11] 4,376,133
[45] Mar. 8, 1983

[54] AGGLOMERATION OF PROTEINACEOUS SOLIDS

[75] Inventor: J. Redmond Farnand, Ottawa, Canada

[73] Assignee: Canadian Patents & Development Limited, Ottawa, Canada

[21] Appl. No.: 246,935

[22] Filed: Mar. 24, 1981

[51] Int. Cl.³ ............................................. A23J 3/00
[52] U.S. Cl. .................................. 426/656; 426/495; 260/123.5
[58] Field of Search ............... 426/656, 657, 430, 495, 426/531; 260/123.5

[56] References Cited

U.S. PATENT DOCUMENTS

| | | | |
|---|---|---|---|
| 2,615,905 | 10/1952 | Forstmann et al. | 426/430 X |
| 3,365,440 | 1/1968 | Circle et al. | 426/430 X |
| 3,897,574 | 7/1975 | Pass | 426/430 |
| 4,219,469 | 8/1980 | Kadan et al. | 260/123.5 |
| 4,279,811 | 7/1981 | Gray et al. | 260/123.5 |

Primary Examiner—Robert A. Yoncoskie
Attorney, Agent, or Firm—Alan A. Thomson

[57] ABSTRACT

Finely divided proteinaceous solids suspended in a non-polar organic liquid are formed into agglomerates by contacting the suspension with an immiscible polar liquid comprising selected alkanol-water mixtures, agitating the 3-phase system to effect agglomeration, separating the agglomerates and recovering the proteinaceous solids. The proteinaceous solids are usually derived from cereal grains or legume seeds, particularly those on which a milling, fractionation or solvent extraction is carried out in a non-polar organic liquid medium.

18 Claims, 1 Drawing Figure

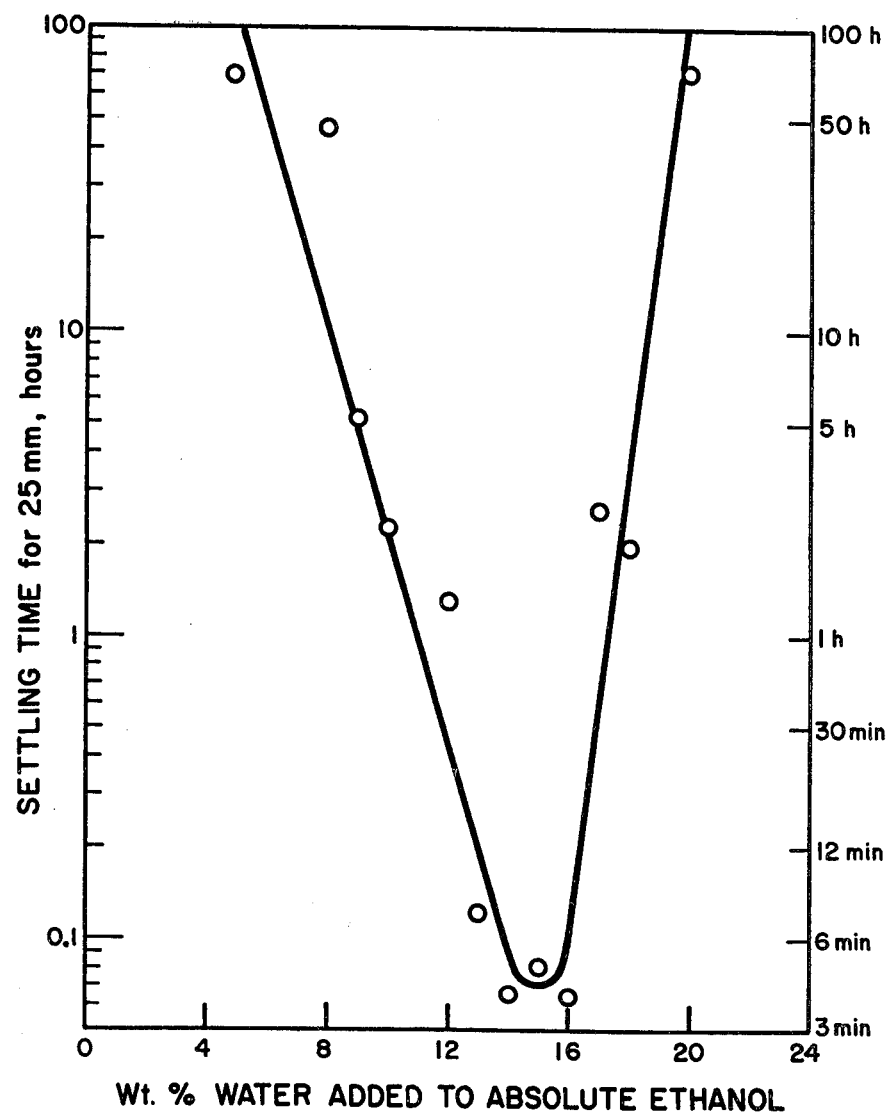

AGGLOMERATION OF PROTEINACEOUS SOLIDS

FIELD OF THE INVENTION

This invention is directed to a process for agglomerating and separating finely divided proteinaceous solids from suspension in a non-polar organic liquid, and to the resulting agglomerates. The proteinaceous solids are usually from cereal grains or legume seeds, especially those on which a solvent extraction, milling or fractionation is conducted in a non-polar organic liquid such as hexane, forming a suspension. Of particular concern is the recovery of protein from stable, colloidal suspensions which cannot readily be separated by filtering or centrifuging.

BACKGROUND AND PRIOR ART

New sources of protein concentrates are being sought to supplement the usual protein materials such as dry milk solids and soybean fractions. The concentration of the protein component in cereals and legumes is receiving much attention at the present time. These protein concentrates find use in diet supplements, bread and other bakery products, and other household foods as well as for industrial applications. The upgrading process usually consists of milling the cereal grain or oil seed to a sufficiently small size to liberate the protein component and separating that component from the other constituents. In one such method, the proteinaceous seed is ground to protein-liberating size (flour) and dispersed in a hydrocarbon solvent, e.g. hexane, where it is agitated to dissolve the oil and fat constituents. The slurry is then settled or centrifuged to separate the denser starch particles from the protein particles. With feed materials like oats and rapeseed, which require very fine grinding for separation, residual protein concentrates or fractions tend to remain in a stable suspension in the hexane-oil liquid, which suspension cannot be separated by centrifuging, filtration, or most other conventional means including hydrocyclones. Spray drying is possible, but it concentrates the vegetable oils and fats with the protein thereby lowering the protein ratio in the concentrate and making it undesirable for many end uses. The high stability of this liquid suspension is probably caused by naturally-occurring surface active agents, e.g. glycolipids and phospholipids peptizing the small proteinaceous particles.

In U.S. Pat. No. 4,154,728, May 15, 1979, R. W. Oughton, a process is described in which certain comminuted proteinaceous material is separated into fractions in the presence of an organic solvent, preferably by centrifugal means. The fractions have differing protein contents. This process is not very effective with oats or oilseed (e.g. rapeseed) solids, which contain considerable oil and require very fine grinding, and leave a very stable colloidal suspension of proteinaceous solids in the solvent.

In Canadian Pat. Nos. 1,082,174 of A. Bell, J. R. B. Boocock and R. W. Oughton, and 1,087,451 of R. W. Oughton similar processes for the separation of a variety of products from comminuted oats are disclosed. This organic solvent (hexane) process separates oats into three fractions: crude oat oil (and other extracted components); oat flour (mainly starch and protein); and oat bran (including some gums and trapped starch and protein). Again the residual solvent contains colloidal proteinaceous particles which have proved difficult to recover. If these solids are allowed to build-up on recycle of solvent, they will lead to high viscosity and other problems.

In some oilseed processing (e.g. rapeseed) where solvent (hexane) is used to contact solids, suspensions of proteinaceous solids may be formed which are difficult or costly to treat by conventional means.

SUMMARY OF THE INVENTION

It has been found possible to agglomerate and separate finely divided proteinaceous solids from suspension in a non-polar liquid by means of a selected agglomerating liquid and controlled agitation. From about seventy agglomerating liquids tested, a synergistic combination has been found most effective. The resulting agglomerates have desirable properties for some purposes.

The invention provides a process for agglomerating and separating finely divided proteinaceous solids from a non-polar organic liquid suspension thereof, comprising:

(i) contacting the suspension with a solids-agglomerating amount of an immisicible polar liquid, comprising lower alkanol-water mixtures, the amount of water being chosen within the range of about 7 to about 24wt% based on the alkanol;

(ii) agitating the 3-phase system to effect the desired agglomeration of the solids;

(iii) separating the agglomerates from the organic liquid suspending medium; and (iv) recovering the proteinaceous solids. The invention includes the agglomerates of finely divided proteinaceous solids comprising a lower alkanol and water, the amount of water being within the range of about 7 to about 24 wt.% based on the alkanol, and the agglomerates dried to a bulk density of about 0.1 to about 0.4 gm/cc. Such dried agglomerates can provide the basis for a breakfast cereal, a snack food, a bakery product mix, or diet supplement.

DESCRIPTION OF DRAWING

The single drawing is a graph of agglomeration-settling time required to settle 25 mm from a 40 mm deep suspension (logarithmic scale) versus wt.% water added to absolute ethanol to form agglomerating liquid.

DETAILED DESCRIPTION AND PREFERRED EMBODIMENTS

The proteinaceous solids being agglomerated can be derived from cereal grains, oilseeds or legume seeds. In particular the finely divided solids usually are derived from one or more of oats, wheat, wheat germ, rye, barley, triticale, buckwheat, rapeseed, cottonseed, peas, beans and peanuts. The process is applicable especially to oats where the organic solvent and agglomeration therefrom leads to a separation and recovery of the high oil and high protein contents.

The non-polar organic liquid used in forming the suspension should be acceptable for use with food, e.g. be inert with respect to the food and nontoxic at residual levels which may remain in the food product. Desirably, the non-polar liquid should be volatile and readily evaporated from the surface of the agglomerates. Suitable non-polar liquids include the saturated hydrocarbons pentane, hexane, heptane, cyclopentane, cyclohexane and mixtures thereof. Hexane is preferred currently, but others may be advantageous in particular systems.

The lower alkanol is selected from the $C_1$ to $C_4$ alcohols, i.e. methanol, ethanol, n- and isopropanol, n- and isobutanol and tertiary butanol and mixtures thereof. Again the alkanol should have no detrimental effect on the food and be nontoxic or removable readily to nontoxic levels in the agglomerated or final product. Ethanol is preferred currently, but isopropanol has advantages in some cases, e.g. if used to agglomerate and then to wash the agglomerates, and phenolics (color) and goitrogenic compounds can be extracted. The selected combination of alkanol and water gives synergistic results, i.e. the agglomeration and settling rate is many times greater than with alkanol or water alone (either alone is inoperative). It is possible to add water-soluble ternary additives to the agglomerating liquid to further accelerate the separation of the proteinaceous solids. These additives may be water-soluble nontoxic or edible acids (or nontoxic salts thereof) such as propionic, tartaric, latic, citric, mellitic, malic, glycollic, phosphoric and sulfur dioxide. Some of these acids (e.g. $SO_2$) will volatilize readily from the agglomerates on drying. A suitable amount of these acids or salts would be from about 0.1 to about 5 wt.% based on the solids. For example, the addition of 0.2% wt. mellitic acid to a 100 parts (wt.) ethanol-15 parts (wt.) water mixture reduced the agglomeration-settling time of a suspension of oat protein concentrate by a factor of 2 approximately (see Example 7).

The amount of water in the agglomerating liquid has been found to be critical for optimum results. Depending on which alcohol is used, the amount of water giving the most rapid agglomeration and separation will fall within the range of about 7 to about 24 wt.% based on the alcohol. With ethanol, the optimum amount of water has been found to be about 14 to 16 wt.% based on the ethanol (see graph for oats fines in hexane). With isopropanol, the optimum amount of water is slightly higher, e.g. about 18-22 wt.% based on isopropanol. Increasing the water in the alkanol-water mixture tends to increase the hardness of the agglomerates (within limits).

For the purpose of agglomerating fine proteinaceous solids, the amount of alkanol-water utilized normally can range from about 60 to about 120% by wt. based on the proteinaceous solids (this range is not sharply critical but can vary). Lower amounts within this range tend to give softer (and smaller) agglomerates.

Water-methanol mixtures were found slightly less effective on oat protein concentrates than water-ethanol mixtures, requiring about 7 minutes to settle a 25 mm layer from suspension. In this case, the settling rate was fairly constant in the range of 12 to 20% water based on the methanol. However, agglomerates produced at the higher end of the water range were much firmer when dried than those produced at the low end of this water range. Methanol should be evaporated from the agglomerates completely.

Propyl and isopropyl alcohols with about 18 to 24% water based on the alcohol have considerable effect on oat protein concentrate, but agglomerating liquid requirements were about double those for ethanol and settling times were about 50 minutes for layers of 25 mm. These alcohols can displace the oils and non-polar liquids from the surface of the solids: however, more agglomerating liquid may be required because a higher proportion is soluble in the non-polar solvent. In continuous operation, the non-polar solvent can be recycled substantially saturated with the propanol (or at least containing some propanol) to keep the amounts of agglomerating liquid similar to the ethanol-water systems. Similar comments apply for the butanols.

The agitation of the 3-phase system to effect agglomeration should be severe enough to disperse the alkanol-water phase and bring the two dispersed phases (liquid and solid) into intimate contact. The operative aqueous agglomerating liquids are believed to displace non-polar liquid and lipids from the proteinaceous surface, and the surfaces wet with alkanol-water gradually come together (preferably with less severe agitation in this second stage) to form agglomerates.

The agglomerates will settle usually in less than 10 minutes to leave a clear or substantially clear solvent phase. The separation can be accelerated by at least one of sieving, centrifuging and filtering. The oils and lipids will be relatively insoluble in the alkanol-water phase and will remain with the solvent (from which they can be recovered by known techniques such as distillation). The solvent or continuous phase will be recycled. The alkanol phase can be evaporated from the agglomerates and the alkanol condensed and recycled.

In some cases, it may be desirable to include in the suspension or in the agglomerating liquid, an additive which will become incorporated into the agglomerates in order to alter the form, texture or other properties for a particular purpose. In order to become uniformly dispersed such additives should be soluble in or preferentially wetted by the alkanol-water agglomerating liquid. For example, calcium or magnesium carbonate, methyl cellulose, lactic acid, glycerol, urea, talc and calcium phosphate (at levels of about 1% of solids) all became incorporated in the agglomerates and led to a softer form of agglomerates. Alum, clay, polyvinylalcohol and citric acid tended to make the agglomerates harder than in the absence of any additive. In general, antioxidants, preservatives, acidulants, leavening agents, anticaking agents, humectants, other nutrients, vitamins or fortifiers, flavouring agents, colouring agents, etc., can be co-agglomerated with the proteinaceous fines to retain or improve desirable characteristics, modify texture or appearance, increase food values, etc. The amount of such additives normally will be within about 0.1 to 2% wt. based on the solids. Some acidic additives such as lactic and citric acids both accelerate the agglomeration-separation and modify the form or texture of the agglomerates.

The separated agglomerates usually are dried to remove any remaining hexane and to at least partially remove the alkanol-water. Small amounts of ethanol and isopropanol may be acceptable in the product. If substantially complete removal is necessary, vacuum and/or heat treatments may be carried out. The agglomerates are non-dusting and easily handled. They can be used in agglomerate form, or as coarse partial agglomerates (meal), or broken down to a flour. The size of the agglomerates can be varied within about 150 to 1000 micrometers by controlling the amount of agglomerating liquid and the agitation. Increasing the amount of water used tends to increase the hardness and density of each agglomerate, and also the size and bulk density of the agglomerates. Thus the hardness and bulk density can be adjusted by control of variables. The agglomerate bulk densities are usually within the range of about 0.1 to about 0.4 gm/cc, and are usually slightly lower than that of the corresponding unsieved flours. The agglomerates per se can be toasted or fat fried to form breakfast cereal or snack foods or components thereof. They can also be incorporated into various bakery products. The agglomerates will have, in most cases, a protein content of at least about 20% by wt.

EXAMPLE 1

Initial Screening of Additives in Aqueous Solution

A sample of oat protein concentrate in a stable hydrocarbon suspension was supplied by DuPont of Canada Ltd. It was obtained by a new fractionation process developed by that company and contained about 5% solids, 93% hexane (with small amounts of other 5 and 6 membered aliphatic hydrocarbons), and 2% vegetable oils and fats. The latter components were dissolved in the hexane. The suspended solids contained about 80% protein with the remainder consisting mostly of starch. The liberated oat protein particles were in the low micron range of diameters and formed a stable suspension which could not be separated from the suspending liquid by centrifuging, filtration, and other conventional means. It would appear that some of the lipids adsorb on the protein particles, making the surface highly hydrophobic. These lipids also interfere with agglomeration of the particles by promoting emulsification when sufficient water is present.

Twenty gram aliquots of the suspension were placed in glass jars and water solutions containing a wide variety of additives (65) in the 0.1 to 5% by wt. concentration range were added in amounts (of solution) of 3 to 5% vol./vol. based on the suspension. The jars were then capped and agitated, usually in a paint shaker, for about ten minutes. Larger samples were agitated in a blender operated in the 20 to 60 volt range. After agitation, the samples were allowed to settle at room temperature and were examined visually for clarity. The additives used, settling time, and degree of clarity of the supernatent liquids were noted.

It was found that the addition of water alone to the system has considerable effect on the settling rate, but a considerable amount of solids remained in suspension as evidenced by a persistent dense cloud. The inorganic acid solutions tested all exhibited a considerable effect on the particle enlargement and settling rate. Sulfur dioxide solution was quite effective in producing a clear supernatant liquid in 4–24 hrs. $SO_2$ should be acceptable as an additive as it could be removed at a drying stage. Most of the water-soluble short chain organic acids tested in solution eventually produced clear supernatant liquids. In general, the stronger organic acids produced the better results with sulfamic and the benzene multicarboxylic acids in the forefront. Glycollic, maleic, lactic, tartaric, citric, and acetic showed considerable effect and would be acceptable additives. Short chain alcohols in low concentrations in aqueous solution were tested also, with ethyl alcohol being the most effective. The water-soluble solvents such as acetone and DMSO in aqueous solution showed only a slight effect. The salts (e.g. $Na_2CO_3$, alum) and alkalis showed considerable effect on the settling rate. However, the alkalis imparted a greenish tinge to the liquid and darkened the agglomerates. Ammonia was somewhat effective in solutions below 0.1% concentration where colour effect disappeared. Other polymeric additives, solvents and commercial surface active agents tested in solution showed only moderate effect. Only aqueous solutions of sulfuric acid, sulfamic acid and mellitic acid were able to settle the suspension in less than 1 hr. For various reasons, these acid solutions per se were judged unacceptable from a food treatment viewpoint. However, this screening indicated that certain acidic additives that were acceptable in food treatment could form part of an agglomerating liquid.

Polar liquids other than water were considered as a basis for an effective agglomerating liquid. Lower alkanol-based liquids were used in a series of tests.

EXAMPLE 2

Ethanol itself was tested on the same suspension as in Example 1 and was found to have no effect on the settling rate.

A series of high ethanol-low water mixtures was prepared and tested as in Example 1 on the same oat proteinaceous suspension. Samples were agitated in a paint shaker for 5 mins. Four percent by wt. of the ethanol-water mixture was added to the suspension in each test (80% by wt. based on the solids), and the settling time measured for 25 mm deep layers from 40 mm deep suspension samples. The results are plotted in the graph. With about 9% water added to the alcohol, the settling is appreciable and increases rapidly with higher water content up to about 14%. At the 14 to 16% range, spectacular results are obtained. Settling takes place in 4 to 5 minutes leaving a clear supernatent liquid, or only a slight haze which disappears in less than 10 minutes. This rapid settling rate is greatly reduced when the water component is increased a few more percent, requiring about 3 days when the water component is increased to 20%. Further increasing the water component to about 40% (not shown) produced a very stable suspension with only partial settling taking place in 3 days.

Although ethanol is a good wetting agent for both proteins and carbohydrates, the ineffectiveness of absolute ethanol is probably due to its solubility in the supernatant liquid. However, the addition of about 9% or more water to the alcohol all but eliminates this solubility. On agitation, this ethanol-water component with its higher affinity for the solids, displaced the carrier liquid from the particle surfaces and effected agglomeration of the particles. The wetting effect, and agglomerate particle size enlargement, was observed to be at its maximum when about 14 to 16% water was added to the alcohol. This probably reflects the multicomponent character of the suspended solids, and suggests that a small portion of certain carbohydrate constituents are better wetted by the water than the alcohol. Also, the solid surfaces may be contaminated by adsorbed oil components which could be displaced by dissolution is ethanol-water. Water, if added in excess, would then act as a negative solvent for the oils, causing them to precipitate and thereby recontaminate the solid surfaces. In addition, too much water probably enhances the stability of the oil-coated particles because of emulsion effects. Thus the amount of water is seen to be critical.

The addition of about 0.2% by wt. of some of the more effective acids, e.g. mellitic or sulfamic, to the optimized ethanol-water system produced a synergistic effect, further reducing the settling time by a factor of two, approximately. Sulfur dioxide or HCl should be similarly effective in low concentration in the ethanol-water phase, and should be substantially removed at the drying stage.

While gravity settling appears adequate, centrifuging or filtering eliminated more of the combined liquid and yielded a product containing about 80% solids. About 97% of the vegetable oils were retained in the supernatant liquid and could be recovered by evaporating the solvents. The hydrocarbon solvent and the ethanol can also be recovered for reuse. Small amounts of oil remaining in the agglomerates were probably entrapped in the interstitual spaces of the agglomerates and could be reduced appreciably by washing the agglomerates with appropriate solvents. The agglomerates withstood such washing and were non-dusting in the dried state: however, they could be readily dispersed in aqueous systems with mild agitation. Agglomerates can be readily produced in the 210–840 μm range by this method with a broader size range possible. Sizes can be varied considerably with the mode of agitation and amount of agglomerating liquid, e.g. agglomerate size can be reduced both with less agglomerating liquid and more vigorous agitation. Conversely, they can be increased in size both with more agglomerating liquid and less vigorous agitation.

EXAMPLE 3

A suspension of a concentrate containing 45% protein was made from rapeseed fines in a similar manner but heptane was used as the carrier solvent. When the suspension was treated with 90% wt. based on the solids, of a mixture of 100 parts ethanol and 16 parts water by wt., and agitated in a blender for 3 minutes at 60 volts followed by 3 minutes at 30 volts, agglomerates about 28 mesh size were formed leaving a clear supernatant liquid. After decanting the supernatant liquid, the oil was recovered by evaporation of the heptane. On drying, the agglomerates became firm, but could readily be broken up by agitation.

EXAMPLE 4

Ten parts of finely ground soyabean flour containing about 48% protein was dispersed in 100 parts hexane and the suspension agitated in a blender for one-half hour to dissolve the oil component. Eight and one-half parts of a 100-parts-ethanol-16-parts-water mixture was then added to the suspension and the blender was operated at 60 volts for a five minute period. The solids formed loosely compacted agglomerates in 250 μm approximate size range. After separating the agglomerates from the suspending liquid on a 100 mesh screen, they were dried at 60° C. The dried agglomerates held their shape but could be readily broken up with mild agitation. When water only was added to a similar suspension, part of the solids formed a sticky lump with the remainder staying in suspension. On drying, the sticky lump formed a hard brittle mass.

EXAMPLE 5

A wheat germ concentrate containing about 23% protein was treated with heptane in a ball mill to mill and extract the oil component. This method permitted the oil extraction and agglomeration of solids to take place consecutively without removing the charge from the mill. The wheat germ fines were stripped of the oil by the heptane and then subsequently agglomerated with the ethanol-water mixture (as in Example 4). The agglomerates and heptane phase were removed from the mill and the agglomerates separated on a 100 mesh screen. The wheat germ oil was recovered by evaporating the solvent. The wheat germ oil recovered was about 4.1% based on the total solids. The ethanol-water mixture effectively disrupted the oil from the pores giving a good separation. Wheat germ oil has a high market value as a natural anti-oxidant additive for many processed foods. The dried agglomerates would be very suitable for incorporating in granola or other breakfast cereals.

Finely ground commercial flours, e.g. concentrated pea protein flour, are known to produce dusting problems in the industry. It was found that these products could be put in non-dusting form by dispersing them in a light aliphatic hydrocarbon liquid and forming loosely structured but firm agglomerates with high alcohol-low water agglomerating liquids.

EXAMPLE 6

One hundred parts of commercial pea protein concentrate containing about 55% protein was dispersed in hexane and agglomerated in a blender with 100 parts of an agglomerating liquid consisting of 100-parts-ethanol-16-parts-water mixture. Small loosely packed agglomerates formed which were separated on a 60-mesh screen. On drying they remained intact and were non-dusting. However, they could be made to disintegrate with mild agitation or by kneading into a dough mixture.

Coarser pea meal supplied by the same source, containing only 28% protein, was agglomerated in a similar manner. In this case, the optimum composition of the agglomerating liquid mixture was found to be about 100 parts ethanol-18 parts water. This higher water content required probably reflects the higher carbohydrate content of the meal.

EXAMPLE 7

Further tests were done with adjuvant acids added to the agglomerating liquid. A suspension of fine oat protein concentrate in hexane was treated according to the invention, the amount of agglomerating liquid added being 90% by wt. of the oat solids. Agitation time was 5 minutes in each test. The effect of the acid adjuvants on settling time and character of the agglomerates are summarized in Table 1.

Such acid additives are seen to significantly reduce the settling times, and various acids can be used to adjust the agglomerate texture as desired.

TABLE 1

| PROTEIN CONCENTRATE SOURCE | AGGLOMERATING LIQUID PARTS BY WT. ETHANOL-WATER | ADJUVANT | ADJUV. AMOUNT %** | SETTLING TIME (MIN.) FOR 25 mm. (APPROX.) LAYER | AGGLOMERATE CHARACTER (DRIED) |
|---|---|---|---|---|---|
| Oat (control) | 100–14 | — | — | 5 | Fairly soft |
| Oat | 100–14 | Mellitic acid | 0.2 | 2.5 | No change |
| Oat | 100–14 | Sulfuric acid | 0.2 | 3 | Firmer |
| Oat | 100–14 | Sulfurous acid | 0.6 | 2 | Firmer |
| Oat | 100–14 | Sulfurous acid | 0.3 | 2 | Firmer |

TABLE 1-continued

| PROTEIN CONCENTRATE SOURCE | AGGLOMERATING LIQUID PARTS BY WT. ETHANOL-WATER | ADJUVANT | ADJUV. AMOUNT %** | SETTLING TIME (MIN.) FOR 25 mm. (APPROX.) LAYER | AGGLOMERATE CHARACTER (DRIED) |
|---|---|---|---|---|---|
| Oat | 100-14 | Lactic acid | 0.3 | 3 | Softer |
| Oat | 100-14 | Sulfamic acid | 0.3 | 2 | Firmer |
| Oat | 100-14 | Malic acid* | 0.3 | 2.5 | Softer |
| Pea (control) | 100-16 | — | — | 4 | Fairly soft |
| Pea | 100-16 | Sulfurous acid | 0.6 | 1.5 | Firmer |

*used as a general purpose food additive and for synthetic flavouring
**% by wt. based on solids

I claim:

1. A process for agglomerating and separating finely divided proteinaceous solids from a non-polar organic liquid suspension thereof, comprising:
   (i) contacting the suspension with a solids-agglomerating amount of an immiscible polar liquid comprising lower alkanol-water mixtures, the amount of water being chosen within the range of about 7 to about 24 wt% based on the alkanol;
   (ii) agitating the 3-phase system to effect the desired agglomeration of the solids;
   (iii) separating the agglomerates from the organic liquid suspending medium; and
   (iv) recovering the proteinaceous solids.

2. The process of claim 1 wherein the lower alkanol is selected from methanol, ethanol and isopropanol.

3. The process of claim 1 wherein the lower alkanol is ethanol and the amount of water is from about 14 to about 16 wt% based on the ethanol.

4. The process of claim 1 wherein the amount of the immiscible polar liquid ranges from about 60 to about 120% by wt. based on the proteinaceous solids.

5. The process of claim 1 wherein the organic liquid is a saturated hydrocarbon.

6. The process of claim 1 wherein the organic liquid is selected from pentane, hexane, heptane, cyclopentane, cyclohexane, and mixtures thereof.

7. The process of claim 1 wherein the organic liquid comprises hexane.

8. The process of claim 1 wherein the proteinaceous solids are derived from cereal grains, oilseeds or legume seeds.

9. The process of claim 1 wherein the proteinaceous solids are derived from sources selected from the group consisting of oats, wheat, wheat germ, rye, barley, triticale, buckwheat, rapeseed, cottonseed, peas, beans, and peanuts.

10. The process of claim 1 wherein a vegetable oil is recovered from the organic liquid after separation of the agglomerates, and the organic liquid recycled.

11. The process of claim 1 wherein the alkanol is recovered from the agglomerates by volatilization and recycled.

12. The process of claim 1 wherein the separation of the agglomerates is carried out by at least one of settling, sieving, centrifuging and filtering.

13. The process of claim 1 wherein the separated agglomerates are washed with a solvent for vegetable oils, phenolics, or goitrogenic compounds.

14. The process of claim 1 wherein food additives which change the taste, hardness, porosity or increase the nutritional value of the agglomerates are included in the suspension or agglomerating liquid and are chosen to be sufficiently hydrophilic so as to be co-agglomerated in step (ii) with the proteinaceous solids.

15. The process of claim 1 wherein water-soluble additives which accelerate the agglomeration-separation of the proteinaceous solids are present in the alkanol-water phase in step (i).

16. The process of claim 1 wherein water-soluble acids or salts thereof are present in step (i).

17. The process of claim 16 wherein the acids are selected from the group consisting of propionic, tartaric, lactic, citric, mellitic, malic, glycollic, phosphoric, and sulfur dioxide.

18. The process of claim 17 wherein the amount of said acid or salt is about 0.1 to 5 wt% based on the solids.

* * * * *